Patented Jan. 12, 1937

2,067,606

UNITED STATES PATENT OFFICE 2,067,606

MANUFACTURE OF ALKALI THIOCYANATES

Edward L. Helwig, Bristol, Pa., assignor to Rohm & Haas Company, Philadelphia, Pa.

No Drawing. Application April 9, 1936,
Serial No. 73,435

4 Claims. (Cl. 23—75)

This invention relates to a process for the manufacture of alkali thiocyanates from cyanides, sulfur, alkali carbonates and compounds containing both sulfur and an alkali metal. It relates more particularly to a process for the production of alkali thiocyanates from zinc cyanide, sulfur or a sulfur-containing compound and an alkali carbonate.

The alkali thiocyanates are produced at present by fusing alkali cyanides with sulfur, by fusing calcium ferrocyanide with sodium thiosulfate and by reacting on thiourea with alkali or alkaline earth metal hydrosulfides.

One object of this invention is to provide a method for the preparation of alkali thiocyanates which utilizes waste products from gas works and coke-ovens. In the purification of fuel gas made from coal a considerable amount of insoluble zinc cyanide is obtained as well as an alkaline scrubbing liquor which contains relatively large amounts of sodium thiocyanate and sodium thiosulfate. It is a further object to provide a method of utilizing these waste products either separately or simultaneously in the production of alkali thiocyanates. By this invention there is further provided a method for the preparation of alkali thiocyanates from raw materials which are considerably cheaper than those now commonly used.

It has been found that sulfur will react to a certain extent with zinc cyanide to form some zinc thiocyanate but the reaction does not go to completion. If, however, the zinc cyanide is suspended in an alkali carbonate solution along with a slight excess of the theoretical quantity of finely ground sulfur and this suspension heated approximately to the boiling temperature the zinc cyanide will be converted quantitatively to sodium thiocyanate and zinc carbonate. The zinc carbonate can then be filtered off and the sodium thiocyanate recovered by evaporation and crystallization of the filtrate.

Another embodiment of my invention makes possible the utilization of the spent alkaline scrubber liquid from the gas purification process. These liquors contain relatively large amounts of sodium thiocyanate, sodium thiosulfate and sodium carbonate. By treating such liquors with zinc cyanide, adding more sulfur and sodium carbonate as required to complete the conversion of the zinc cyanide to sodium thiocyanate, and then heating the suspension thus made, all of the zinc cyanide will be converted to sodium thiocyanate, and the sodium thiosulfate will be converted to sodium sulfite. The sulfur removed from the thiosulfate reacts with the cyanide to produce thiocyanate.

This invention may be illustrated by the following examples but it is not limited to the exact conditions of concentration, temperature and time given as the invention may be otherwise practiced within the scope of the appended claims.

Example 1

In a container of 5 liters capacity provided with a stirrer 117 grams (1 mol.) of zinc cyanide and 70 grams (2.2 mols) of powdered sulfur are suspended in 280 grams of water to which 106 grams (1 mol.) of sodium carbonate is added. This mixture is heated to boiling (103° C.) for six hours. At the end of this time the reaction is complete. The insoluble zinc carbonate is filtered off, washed with water and the filtrate and washings evaporated to dryness. 171 grams of sodium thiocyanate having a purity of 90 per cent. was obtained. The impurities consist of sodium sulfate and water crystallization, the sodium sulfate coming from zinc sulfate originally contained in the zinc cyanide sludge. The yield is 95 per cent. of the theory.

Example 2

In a similar apparatus 117 grams (1 mol.) of zinc cyanide was suspended in 280 grams of water in which were dissolved 316 grams (2 mols) of sodium thiosulfate and 106 grams (1 mol.) of sodium carbonate. After five hours heating at 95–98° C. the reaction was complete. The zinc carbonate was filtered off and washed with water. On evaporating and removing the sodium sulfite by crystallization, 173 grams of sodium thiocyanate 90 per cent. pure was obtained. This is equivalent to a yield of 96 per cent.

Example 3

A spent alkaline scrubber liquor containing 227 grams of sodium thiocyanate, 63 grams of sodium thiosulfate and 25 grams of sodium carbonate per liter was treated with 119 grams of zinc cyanide and to this mixture was added 70 grams of sulfur and 86 grams of additional sodium carbonate. The resulting suspension was heated at 90–107° C. for six and one-half hours after which time the zinc carbonate was filtered off and washed. 379 grams of 100 per cent. sodium thiocyanate was recovered from the filtrate and washed which is equivalent to a yield of 92 per cent. from the zinc cyanide. The thiocyanate originally in the liquor was recovered quantitatively.

The above examples describe the nature of the invention but the details are determined by conditions under which the preparation is carried out. It is advisable to use finely ground sulfur because the time of the reaction depends largely on the temperature and the intimacy of the contact between the zinc cyanide and the sulfur. The reaction may also be carried out under pressure in order to obtain higher temperatures and thus a more rapid reaction. Agitation of the mixture is desirable but is not necessary because the finely divided solids may be held in suspension for a considerable length of time. In cases where the solution is boiled agitation is not necessary at all.

I claim:

1. The process of preparing alkali thiocyanates which comprises heating a suspension of zinc cyanide in an aqueous alkali carbonate solution with at least one of the group consisting of sulfur and an alkali thiosulfate.

2. The process of preparing alkali thiocyanates which comprises heating a suspension of zinc cyanide in an aqueous alkali carbonate solution with sulfur in amount slightly in excess of that theoretically required to combine with the cyanide ions to form thiocyanate ions.

3. The process of preparing alkali thiocyanates which comprises heating a suspension of zinc cyanide in an aqueous alkali carbonate solution with an alkali thiosulfate containing available sulfur in amount slightly in excess of that theoretically required to combine with the cyanide ions to form thiocyanate ions.

4. The process of preparing alkali thiocyanates which comprises heating a suspension of zinc cyanide in an aqueous alkali carbonate solution with sulfur and an alkali thiosulfate, the total amount of available sulfur being slightly in excess of that theoretically required to combine with the cyanide ions to form thiocyanate ions.

EDWARD L. HELWIG.